(12) United States Patent
Isomura et al.

(10) Patent No.: US 7,585,347 B2
(45) Date of Patent: Sep. 8, 2009

(54) CERAMIC FILTER

(75) Inventors: Manabu Isomura, Tsushima (JP); Tatsuya Hishiki, Nagoya (JP); Makoto Teranishi, Nagoya (JP); Tomonori Takahashi, Chita (JP)

(73) Assignee: NGK Insulators, Ltd., Nagoya (JP)

(*) Notice: Subject to any disclaimer, the term of this patent is extended or adjusted under 35 U.S.C. 154(b) by 288 days.

(21) Appl. No.: 11/375,089

(22) Filed: Mar. 14, 2006

(65) Prior Publication Data

US 2006/0213165 A1 Sep. 28, 2006

(30) Foreign Application Priority Data

Mar. 22, 2005 (JP) .................. 2005-081417

(51) Int. Cl.
- B01D 39/06 (2006.01)
- B01D 24/00 (2006.01)
- B01D 39/14 (2006.01)
- B01D 53/22 (2006.01)
- C04B 35/48 (2006.01)

(52) U.S. Cl. .................. 55/523; 55/522; 55/524; 501/104; 96/10

(58) Field of Classification Search ........ 55/522–524; 96/10; 501/104
See application file for complete search history.

(56) References Cited

U.S. PATENT DOCUMENTS

| | | | |
|---|---|---|---|
| 4,018,687 A * | 4/1977 | Zahour | 210/448 |
| 4,902,319 A * | 2/1990 | Kato et al. | 55/523 |
| 5,143,614 A | 9/1992 | Soria et al. | |
| 6,716,275 B1 | 4/2004 | Reed et al. | |
| 7,112,237 B2 * | 9/2006 | Zeller et al. | 95/273 |
| 2003/0114293 A1 * | 6/2003 | Mizuno et al. | 501/80 |

FOREIGN PATENT DOCUMENTS

| | | |
|---|---|---|
| EP | 0 442 410 | 8/1991 |
| EP | 0 509 792 | 10/1992 |
| EP | 1 318 125 | 6/2003 |
| EP | 1 457 243 | 9/2004 |
| JP | 01-138153 | 5/1989 |
| JP | 03-080126 | 4/1991 |
| JP | 04-149039 | 5/1992 |
| JP | 04-348302 A1 | 12/1992 |
| JP | 2002-109923 A1 | 4/2002 |
| JP | 2002-220255 | 8/2002 |

OTHER PUBLICATIONS

English translation for JP application, JP 03080126, Hideyuki et al. Glaze Compostion, Apr. 4, 1991.*

* cited by examiner

*Primary Examiner*—Walter D Griffin
*Assistant Examiner*—Amber Orlando
(74) *Attorney, Agent, or Firm*—Burr & Brown

(57) ABSTRACT

A ceramic filter is provided, including a base body having partition walls made of a ceramic porous body and defining cells, filter membranes provided on the partition walls which are made of a ceramic porous body having an average pore diameter smaller than that of the surface of each partition wall, and a glass seal provided to cover at least the end face of the base body. The glass seal includes an alkali-free glass containing silica ($SiO_2$) in an amount of 55 to 65 mol %, zirconia ($ZrO_2$) in an amount of 1 to 10 mol % and at least one kind of alkaline earth metal oxide selected from calcia, baria and strontia, but which does not substantially contain zinc oxide.

3 Claims, 1 Drawing Sheet

CERAMIC FILTER

BACKGROUND OF THE INVENTION AND RELATED ART STATEMENT

The present invention relates to a ceramic filter which is used for removal of the suspended matter, microbes, dust etc. contained in a fluid such as liquid, gas or the like.

Ceramic filters using a ceramic porous body have various advantages; that is, they are superior to polymeric membranes in mechanical strength and durability and accordingly high in reliability, they are highly anti-corrosive and accordingly low in deterioration when washed with a chemical (e.g. acid and alkali) solution, further they can be precisely controlled in the average pore diameter which determines the filtration ability. Therefore, they are in use in extensive fields such as water treatment, gas treatment, medicine, food and the like, for filtration and removal of the suspended matter, microbes, dust, etc. contained in a fluid such as liquid, gas or the like.

In recent years, worldwide water shortage and problems caused by pathogenic microbes including Cryptosporidium and 0-157 have become serious. This has necessitated a water purifier enabling easy production of water which is sufficiently safe and has high quality. As a water purifier which can effectively remove, by a simple operation, the harmful substances (e.g. suspended matter and pathogenic microbes) contained in a liquid, ceramic filters are drawing attention.

In order to maintain a required filtration ability and an intra-filter high permeability of fluid, many of the ceramic filters have a structure constituted by:

a base body made of a ceramic porous body (average pore diameter: about 1 to several hundreds μm), and filter membranes provided on the base body, made of a ceramic porous body having an average pore diameter (about 0.01 to 1.0 μm) smaller than that of the base body. There is widely used, for example, a structure constituted by:

a tubular or monolithic base body having partition walls made of a ceramic porous body, wherein cells each functioning as a passage of a fluid are defined by the partition walls, and filter membranes provided on the partition walls.

In many cases, ceramic filters are used by, as shown in FIG. 2, being accommodated in a housing 22 in such a state that the outer surface of base body 12 and its end face SE are separated gas-tightly by the use of an elastic sealing material 20 (e.g. an O-ring). However, in a ceramic filter (e.g. a ceramic filer 30 shown in FIG. 2), having a structure wherein the end face of the ceramic porous body (having a relatively large average pore diameter) constituting the base body 12 is exposed, there is a fear that a to-be-treated fluid F enters the inside of the base body 12 from its end face and is discharged outside the outer surface of the base body 12 without permeating the filter membrane 14. In a ceramic filter having such a structure, there is a fear that not only intended filtration is impossible but also mixing of to-be-treated fluid F into treated fluid after permeation through filter membrane 14 invites contamination of the treated fluid after permeation.

In order to solve such a problem, there was proposed a ceramic filter 10 such as shown in FIG. 1, provided with a glass seal 16 so as to cover at least the end face $S_E$ of base body 12 (see, for example, Patent Literatures 1 and 2).

In a ceramic filter having such a structure, since the end face of base body 12 is covered with a glass seal 16, there can be avoided a phenomenon that a to-be-treated fluid F enters the inside of the base body 12 from its end face and is discharged outside the outer surface of the base body 12 without permeating the filter membrane 14. As a result, the to-be-treated fluid F always permeates the filter membrane 14 and the partition wall 24 and is discharged outside the outer surface of the base body 12, whereby intended filtration becomes possible and the mixing of to-be-treated fluid F into treated fluid after permeation through filter membrane 14 and resultant contamination of the treated fluid after permeation can be prevented effectively.

Patent Literature 1: JP-B-1995-92527
Patent Literature 2: JP-A-2002-109923

With the above-mentioned ceramic filter provided with a glass seal, it is known that, when it is used continuously, the fluid permeability is reduced gradually and the ability as a filter is reduced. The reason is considered to be that the suspended matter (particularly, organic suspended matter) removed by filtration deposits gradually on the filter membranes of ceramic filter and the deposit plugs the pores of the ceramic porous body constituting each filter membrane. Hence, there is generally conducted, periodically or when necessary, a washing operation called "chemical washing" to the ceramic filter. There is conducted, for example, a washing operation which comprises removing organic suspended matter using an alkaline chemical solution (e.g. an aqueous solution of sodium hypochlorite) and then removing inorganic suspended matter using an acidic chemical solution (e.g. an aqueous citric acid solution). This chemical washing can peel off and remove the suspended matter, etc. which have deposited on the filter membranes of ceramic filter, whereby the fluid permeability of ceramic filter can be recovered to a level close to the original level.

In the membrane separator described in the Patent Literature 1, however, the base body and filter membranes in the vicinity of the glass seal has tended to be eroded when the above-mentioned chemical washing is repeated, and its corrosion resistance has not been sufficient.

Meanwhile, in the ceramic membrane filter described in the Patent Literature 2 proposed by the present applicant, there is controlled, in a given range, the difference between the alkali component content of the sintering aid used in formation of base body and filter membranes and the alkali component content in glass seal, whereby the erosion of the base body and filter membranes in the vicinity of glass seal is suppressed and the ceramic membrane filter has high corrosion resistance. Recently, however, there has been desired a ceramic filter which can withstand chemical washing of a large number of times and accordingly has excellent corrosion resistance; therefore, even with the ceramic membrane filter described in the Patent Literature 2, the corrosion resistance is not fully satisfactory and there is a room for improvement.

As described above, currently there is no disclosure on a ceramic filter which can effectively prevent the erosion of the base body and filter membranes in the vicinity of glass seal, can withstand chemical washing of a large number of times and has excellent corrosion resistance. Development of such a ceramic filer is solicited in related industries.

SUMMARY OF THE INVENTION

The present invention has been made in order to solve the above-mentioned problems of the prior art and provides a ceramic filter which can effectively prevent the erosion of the base body and filter membranes in the vicinity of glass seal, can withstand the chemical washing of a large number of times, has excellent corrosion resistance, and has superior effects as compared with conventional ceramic filters.

In developing the ceramic filter of the present invention, the present inventors first made investigation on the reason why the ceramic membrane filter described in the Patent Literature 2 shows no sufficient corrosion resistance.

The ceramic membrane filter described in the Patent Literature 2 was developed based on the finding by the present applicant that, in forming the glass seal, the alkali component derived from the glass seal is concentrated at the interface between the glass seal and the base body/the filter membranes and this concentrated alkali component reduces the corrosion resistance of the filter. Specifically explaining, in the above filter, the difference between the alkali component content in the sintering aid used in formation of base body and filter membranes and the alkali component content in glass seal was controlled in a given range; thereby, the migration of alkali component from the glass seal was suppressed, the concentration of the alkali component derived from the glass seal, at the interface between the glass seal and the base body/the filter membranes was prevented, and the improvement of the corrosion resistance of filter was aimed.

In the ceramic membrane filter described in the Patent Literature 2, certainly the migration of alkali component from the glass seal is suppressed and the corrosion resistance is higher than that of the membrane separator of the Patent Literature 1. However, the in-depth investigation by the present inventors indicated that even in the ceramic membrane filter described in the Patent Literature 2, there occurs the migration of alkali component from the glass seal even though it is slight, and this migration of alkali component causes a reduction in the corrosion resistance of filter.

Hence, the present inventors made a study. As a result, the present inventors found that the migration of alkali component from the glass seal is suppressed almost completely by using, as the material constituting the glass seal, an alkali-free glass having a particular composition. The finding has led to the completion of the present invention. The present invention specifically provides a ceramic filter and an alkali-free glass, both shown below.

According to a first aspect of the present invention, a ceramic filter is provided, having A base body having partition walls made of a ceramic porous body having a large number of pores, wherein cells each functioning as a passage of a fluid are defined by the partition walls, and filter membranes provided on the partition walls, made of a ceramic porous body having a large number of pores whose average pore diameter is smaller than that of the surface of each partition wall.

A glass seal is also provided so as to cover at least the end face of the base body. The glass seal is constituted by an alkali-free glass containing silica ($SiO_2$) in an amount of 55 to 65 mol %, zirconia ($ZrO_2$) in an amount of 1 to 10 mol % and at least one kind of alkaline earth metal oxide selected from calcia (CaO), baria (BaO) and strontia (SrO) but substantially not containing zinc oxide (ZnO).

According to a second aspect of the present invention, the ceramic filter according to the first aspect is provided, wherein at least part of each ceramic porous body has a structure wherein aggregated particles are bonded to each other with a glass component.

According to a third aspect of the present invention, a ceramic filter according to the first or the second aspects is provided, wherein the alkali-free glass contains the alkaline earth metal oxide in an amount of 20 to 30 mol %.

According to a fourth aspect of the present invention, a ceramic filter according to any of the first through third aspects is provided, wherein the alkaline earth metal oxide contains calcia in an amount of 20 to 50 mol % relative to the total mols of the alkaline earth metal oxide.

According to a fifth aspect of the present invention, an alkali-free glass is provided containing silica ($SiO_2$) in an amount of 55 to 65 mol %, zirconia ($ZrO_2$) in an amount of 1 to 10 mol % and at least one kind of alkaline earth metal oxide selected from calcia (CaO), baria (BaO) and strontia (SrO) but substantially not containing zinc oxide (ZnO).

According to a sixth aspect of the present invention, an alkali-free glass according to the fifth aspect is provided, which contains the alkaline earth metal oxide in an amount of 20 to 30 mol %.

According to a seventh aspect of the present invention, an alkali-free glass according to the fifth or sixth aspects is provided, wherein the alkaline earth metal oxide contains calcia in an amount of 20 to 50 mol % relative to the total mols of the alkaline earth metal oxide.

The ceramic filter of the present invention can effectively prevent the erosion of the base body and filter membranes in the vicinity of the glass seal, can withstand chemical washing of a large number of times, and exhibits excellent corrosion resistance.

BRIEF DESCRIPTION OF THE DRAWINGS

In FIGS. 1 and 2, 10 and 30 are each a ceramic filter; 12 is a base body; 14 is a filter membrane; 16 is a glass seal; 18 is a cell; 20 is a sealing material; 22 is a housing; 24 is a partition wall; $S_E$ is an end face; and F is a to-be-treated fluid.

DETAILED DESCRIPTION OF THE INVENTION

Figure 1:
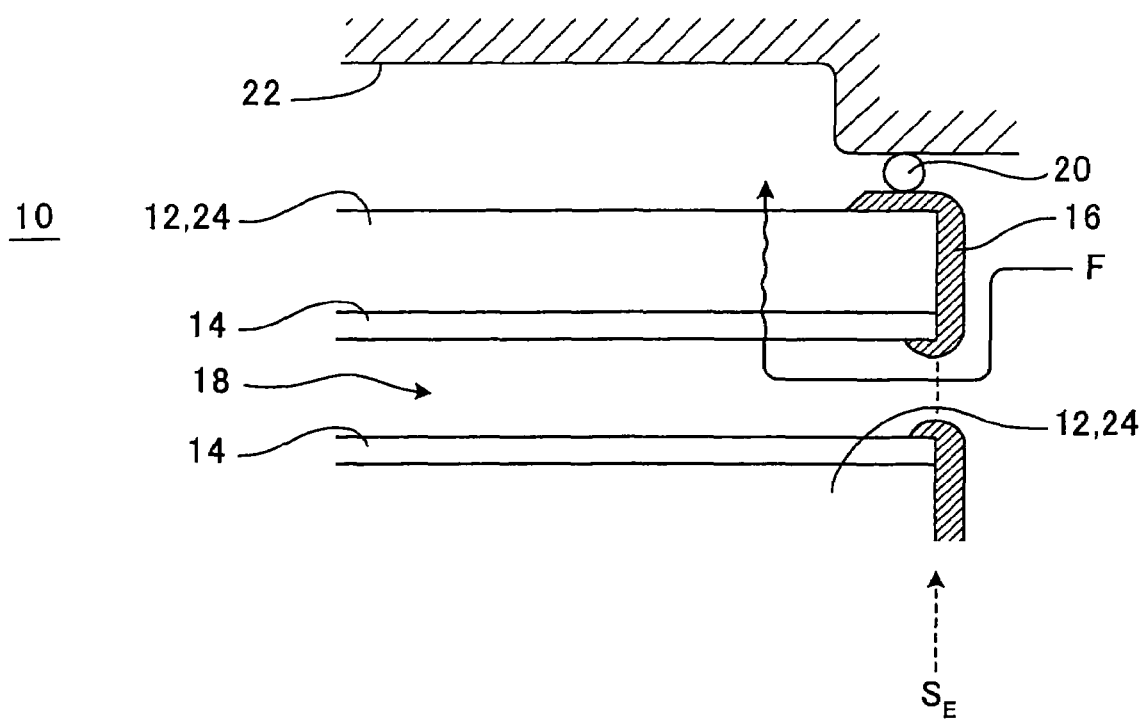
FIG. 1 is a conceptual view indicating a state that a ceramic filter provided with a glass seal has been accommodated in a housing. It is a schematic sectional view when the ceramic filter has been cut along the central axis and the resulting section has been seen from the side of the ceramic filter.
Figure 2:
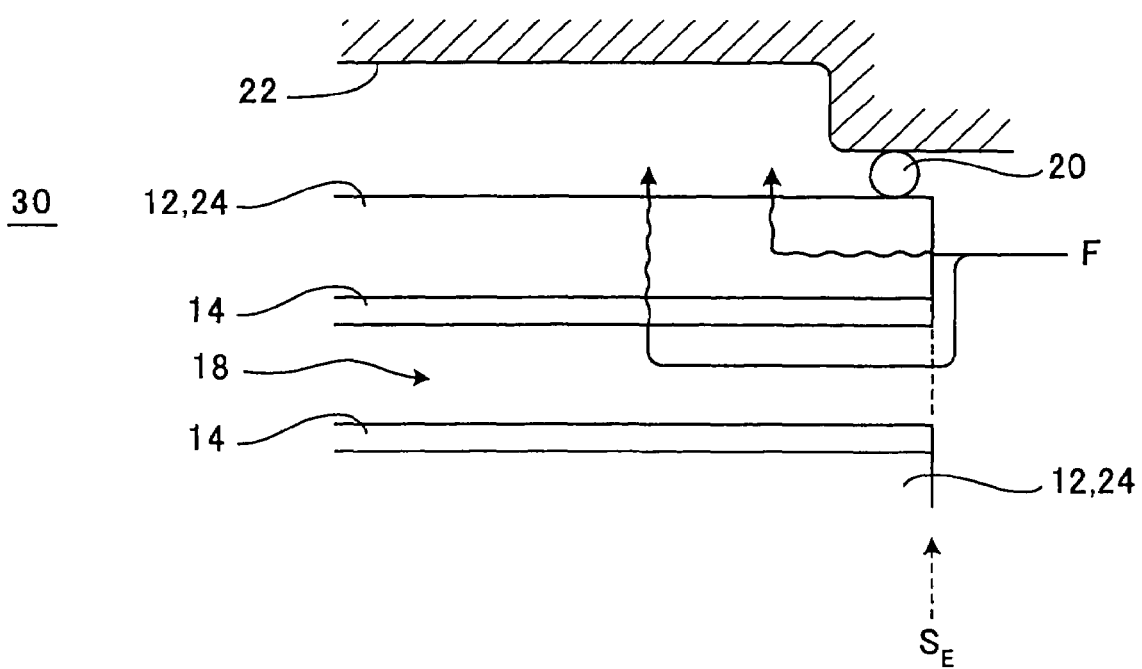
FIG. 2 is a conceptual view indicating a state that a ceramic filter provided with no glass seal has been accommodated in a housing. It is a schematic sectional view when the ceramic filter has been cut along the central axis and the resulting section has been seen from the side of the ceramic filter.

The best mode for carrying out the ceramic filter of the present invention is described specifically below. However, the present invention is in no way restricted to the following mode.

The ceramic filter of the present invention has:

a base body having partition walls made of a ceramic porous body having a large number of pores, wherein cells each functioning as a passage of a fluid are defined by the partition walls.

filer membranes provided on the partition walls, made of a ceramic porous body having a large number of pores whose average pore diameter is smaller than that of the surface of each partition wall, and a glass seal provided so as to cover at least the end face of the base body, wherein the glass seal is constituted by an alkali-free glass having a particular composition. Each constituent element is described below.

[A] Base Body

In the present specification, "base body" means a body having partition walls made of a ceramic porous body, wherein cells each functioning as a passage of a fluid are defined by the partition walls. When such a base body is used and when a to-be-treated fluid containing harmful substances (e.g. suspended matter and pathogenic microbes) permeates the partition walls and flows into the cells or leaves the cells, the harmful substances can be removed by the partition walls and the fluid which flows into the cells or leaves the cells, can be recovered as a purified, treated fluid.

The average pore diameter of the ceramic porous body constituting the base body is determined in consideration of the balance between the mechanical strength and filtration resistance of the ceramic porous body. Ordinarily, a ceramic porous body having an average pore diameter of about 1 to several hundreds μm is used as the base body.

The base body can be obtained, for example, by a method which comprises mixing and kneading aggregate particles, a dispersing medium and, as necessary, additives such as surfactant and the like to obtain a puddle and subjecting the puddle to molding, drying and firing. The average pore diameters of the base body and the filter membranes can be controlled by the average particle diameters of the aggregate particles constituting the base body and the filter membranes. Thus, use of aggregate particles of large average particle diameter enables constitution of a base body or filter membranes of large pore diameter, and use of aggregate particles of small average particle diameter enables constitution of a base body or filter membranes of small pore diameter.

In the ceramic filter of the present invention, at least part of the ceramic porous bodies constituting the base body and the filter membranes has a structure wherein the aggregate particles are bonded to each other by a glass component (a sintering aid). A ceramic filter having such a structure can be produced by firing of lower temperature; therefore, the deformation of base body due to excessive firing can be prevented, the energy required for firing can be reduced; and lower-cost production becomes possible. The present invention contributes to effective prevention of deterioration of ceramic filter having such a structure as well as to improvement of its corrosion resistance. A ceramic porous body having such a structure can be obtained by mixing a puddle for obtaining a base body or a slurry for forming filter membranes, with appropriate amounts of aggregate particles and a glass frit (as a sintering aid). Ordinarily, there can be preferably used a mixture comprising 65 to 90 parts by mass of aggregate particles and 10 to 35 parts by mass of a sintering aid.

The ceramic porous body is constituted, for example, by a ceramic such as alumina ($Al_2O_3$), titania ($TiO_2$), mullite ($Al_2O_3 \cdot SiO_2$), zirconia ($ZrO_2$) or the like. Of these, there can be preferably used, as a constituent material (a ceramic), alumina because, with alumina, aggregate particles controlled in particle diameter are easily available, a stable puddle can be formed, and a high corrosion resistance is obtained.

With respect to the shape of the base body, a tubular shape and a monolithic shape can be mentioned as representative shapes. The tubular shape is a shape having a cylindrical partition wall made of a ceramic porous body, wherein a single cell extending through the central portion is formed by the partition wall. Meanwhile, the monolithic shape is a shape (a so-called honeycomb shape) having lattice-like partition walls made of a ceramic porous body, wherein a large number of parallel cells are formed by the partition walls. Of these, the monolithic filter is preferred because it has a large filtration area per unit volume and accordingly has a high treatment ability.

The base body may be constituted by combining two or more kinds of ceramic porous bodies having different average pore diameters. For example, it is a preferred embodiment to constitute the base body by a main portion of base body and a surface layer disposed so as to cover the partition wall surface of the main portion of base body, wherein the surface layer is made of a ceramic porous body having a large number of pores whose average pore diameter is smaller than that of the partition wall surface of the main portion of base body.

When there is formed, on the surface of a ceramic porous body (a base body) having a large pore diameter, a ceramic porous body (each filter membrane) having an average pore diameter extremely smaller than the above large pore diameter, it is necessary to use aggregate particles of small average particle diameter when preparing a slurry for formation of the filter membrane. In such a case, there is a fear that the aggregate particles in the slurry penetrate into the pores of base body, plugging the pores and reducing the permeability of fluid. The above-mentioned structure of the base body constituted by the main base body portion and the surface layer is preferred because, with the structure, the aggregate particles in the slurry can be trapped by the surface layer and the penetration of the aggregate particles into the pores of the base body can be prevented. In the above structure, by making smaller the average pore diameter of ceramic pore diameter in the order of the base body main portion, the surface layer and each filter membrane (the average pore diameter of the base body main portion is the largest), the resulting ceramic filter can have a good balance between the filtration ability and the treatment ability. The surface layer may be formed in two or more layers and, in such a case, it is preferred to form the surface layers so that the respective average pore diameters become smaller from the base body toward each filter membrane.

The base body having the above-mentioned structure can be formed, for example, by a method which comprises mixing aggregate particles, a dispersing medium and, as necessary, additives (e.g. a surfactant) to prepare a slurry for membrane formation, coating the slurry on the partition wall surface of the base body main portion made of a ceramic porous body, and subjecting the resulting material to drying and firing.

As to the overall shape and size of the base body, there is no particular restriction as long as they do not impair the filtration ability of the base body. As the overall shape, there can be mentioned, for example, a column, a quadrangular prism and a triangular prism. Of these, a column is preferred because it is easily obtained by extrusion, is low in deformation in firing, and is easy to seal to a housing. When used in fine filtration or ultra-fine filtration, there is preferred a column having an outer diameter of about 30 to 180 mm and a length of about 150 to 2,000 mm.

As the cell shape (the shape of a cell section normal to the flow direction of fluid), there can be mentioned, for example, a circle, a tetragon, a pentagon, a hexagon and a triangle.

[B] Filter Membranes

In the present specification, "filter membranes" mean filter membranes provided on the partition walls, made of a ceramic porous body having a large number of pores whose average pore diameter is smaller than that of the surface of each partition wall of base body. In the ceramic filter of the present invention having such filter membranes on a base body, the filtration ability is exhibited by the filter membranes and accordingly the average pore diameter of the base body can be made large. As a result, the flow resistance of fluid when the fluid which has left each cell via each partition wall, permeates the base body inside, can be reduced and an improved fluid permeability can be obtained.

The average pore diameter of the ceramic porous body constituting each filter membrane differs depending upon the filtration ability required (the particle diameter of to-be-removed substance). It is about 0.01 to 1.0 μm in the case of, for example, a ceramic filter used in fine filtration or ultra-fine filtration.

The filter membranes can be formed, for example, by a method which comprises mixing aggregate particles, a dispersing medium and, as necessary, additives (e.g. a surfactant) to prepare a slurry for membrane formation, coating the slurry on the partition wall surface of the base body, and subjecting the resulting material to drying and firing. The average pore diameter of the aggregate particles used in the slurry is preferably about 0.1 to 10 μm. The membrane formation by coating can be conducted by a known membrane formation method such as dipping membrane formation method or the like. It is preferably conducted by a filter membrane formation method (see JP-B-1988-66566) capable of effectively preventing membrane defects (e.g. pin holes).

[C] Glass Seal

In the present specification, "glass seal" means a fluid-non-permeable seal material provided so as to cover at least the end face of the base body. This glass seal is a member for preventing the penetration of to-be-treated fluid into the base body from the end face of the base body.

The ceramic filter of the present invention is characterized in that an alkali-free glass is used as a material of the glass seal. Such a constitution of the glass seal suppresses the migration of alkali component from glass seal almost completely; thereby, the concentration of the alkali component derived from glass seal, at the interface between glass seal and base body/filter membranes is prevented and the corrosion resistance of filter can be improved strikingly. As a result, the erosion of the base body and filter membranes in the vicinity of glass seal can be prevented effectively and there is obtained a filter which can withstand chemical washing of large number of times and which has excellent corrosion resistance.

In general, "alkali-free glass" refers to a glass wherein the content of alkali metal oxide is zero or extremely low. In the present invention, it means a glass wherein the total content of alkali metal oxide is 1 mol % or less. Incidentally, in the present invention, "content" means a value obtained when a frit powder constituted by the glass is analyzed by ICP (inductively coupled plasma atomic emission spectrometry) to quantitatively determine a particular constituent element contained in the glass. Specifically, it means a ratio of the mols calculated from the conversion of particular element into its oxide, to the total mols calculated from the conversion of the total constituent elements of alkali-free glass into their oxides.

The alkali-free glass is highly preferred from a standpoint that it suppresses the migration of alkali components from the glass seal and increases the corrosion resistance of the ceramic filter. However, there are cases that the corrosion resistance of alkali-free glass per se is insufficient. In order for the alkali-free glass per se to have high corrosion resistance, it is necessary to use an alkali-free glass having the following composition.

Firstly, the alkali-free glass needs to contain silica in an amount of 55 to 65 mol %. When the content of silica is less than 55 mol %, the glass may not have sufficient corrosion resistance. Meanwhile, when the content is more than 65 mol %, the glass has high corrosion resistance but crystals such as cristobalite, tridymite and the like may appear in the glass; such crystals cause modification at about 200° C. and resultantly volume change, which may generate cracks in the glass.

Secondly, the alkali-free glass needs to contain zirconia in an amount of 1 to 10 mol %. When the content of zirconia is less than 1 mol %, the too low content of zirconia may show no sufficient increase in corrosion resistance possessed by zirconia. Meanwhile, when the content is more than 10 mol %, zirconia crystals tends to appear in the glass; this appearance of crystals tends to generate cracks in the glass, which may show no sealing function.

Thirdly, the alkali-free glass needs to contain at least one kind of alkaline earth metal oxide selected from calcia, baria and strontia. The alkali-free glass is preferred to contain the alkaline earth metal oxide in an amount of 20 to 30 mol %. A content of the alkaline earth metal oxide, of less than 20 mol % is not preferred because formation of homogeneous glass tends to be difficult. Meanwhile, a content of more than 30 mol % is not preferred because the resulting alkali-free glass tends to have low corrosion resistance.

The alkaline earth metal oxide is preferred to contain calcia in an amount of 20 to 50 mol % relative to the total mols of the alkaline earth metal oxide. That is, the alkaline earth metal oxide is preferred to contain calcia in an amount of 20 to 50 mol % relative to the total mols of calcia, baria and strontia. A calcia content of the above range in the alkaline earth metal oxide is preferred because the amount of wollastonite (Ca-$SiO_2$) crystals formed in glass can be reduced and the corrosion resistance of alkali-free glass can be increased further.

A calcia content of less than 20 mol % is not preferred because formation of homogeneous glass may be difficult. Meanwhile, a calcia content of more than 50 mol % is not preferred because the reduction in the amount of wollastonite crystals formed may be insufficient.

Fourthly, the alkali-free glass needs to contain substantially no zinc oxide. In the present invention, "contain substantially no zinc oxide" means a zinc oxide content of 2 mol % or less in whole alkali-free glass.

The content of zinc oxide needs to be 2 mol % or less and is preferred to contain 0 mol %, i.e. no presence of zinc oxide. In the case of a zinc oxide content of more than 2 mol %, when the ceramic filter (i.e. the glass seal) has been immersed in an acidic solution, zinc diffuses in the glass seal or on the surface of the glass seal, which may reduce the corrosion resistance of the alkali-free glass per se.

The alkali-free glass contains no alkali metal oxide showing an effect for melting point depression; therefore, the firing temperature when a glass seal is formed with such an alkali-free glass, is high, reducing processability of glass seal formation. Hence, it is preferred to use an alkali-free glass containing, in place of the alkali metal oxide, a component [e.g. alumina ($Al_2O_3$) or boron oxide ($B_2O_3$)] showing an effect for melting point depression. Use of such a component in alkali-free glass reduces the melting point of glass; as a result, the firing temperature in glass seal formation can be reduced and glass seal formability can be improved.

As such a component, boron oxide is preferably used in an amount of 1 to 8 mol %. A boron content of less than 1 mol % is not preferred because the content is too low and the effect for melting point depression, possessed by boron oxide can not be exhibited sufficiently. Meanwhile, a boron content of more than 8 mol % is not preferred because the corrosion resistance of alkali-free glass tends to decrease. Use of alumina in an amount of 1 to 8 mol % is also preferred for the same reason.

Further, the alkali-free glass used as the glass seal of ceramic filter is preferred to have a small difference in thermal expansion coefficient, against the base body and the filter membranes.

As an alkali-free glass that had been preferred when alumina is used as the base body and the filter membranes, there can be mentioned, for example, an alkali-free glass [GA-13 (trade name), a product of Nippon Electric Glass Co., Ltd.] containing 59 mol % of silica, 5 mol % of alumina, 5 mol % of born oxide, 15 mol % of calcia, 12 mol % of baria and 3 mol % of zinc oxide. This alkali-free glass is preferred from the standpoint of small difference in thermal expansion coefficient against the base body and the filter membranes; however, it has a drawback in that the corrosion resistance of glass per se is low because no zirconia is contained as a constituent component and moreover zinc oxide is contained in an amount of more than 2 mol %. Therefore, it is unusable per se as an alkali-free glass of the present invention.

The glass seal can be produced, for example, by the following method. First, various different glass materials are mixed in a preferred composition mentioned above, melted for homogeneity, cooled, and ground into an average particle diameter of about 10 to 20 μm to prepare a frit. The frit is mixed with water and an organic binder to prepare a slurry for formation of glass seal. The slurry for glass seal formation is coated on the end face of ceramic filter, followed by drying and firing, whereby a glass seal can be formed.

EXAMPLES

The ceramic filter of the present invention is described specifically below by way of Examples. However, the Examples indicate some of the embodiments of the present invention and the ceramic filter of the present invention should not be interpreted based only on these Examples.

[Base Body]

In the Examples and Comparative Examples, a base body constituted as follows was used as the base body of the ceramic filter. The base body was a tubular base body of 10 mm (outer diameter), 7 mm (inner diameter) and 500 mm (length), made of an alumina porous material having an average pore diameter of 10 μm as measured by mercury porosity.

The base body was produced as follows. At first, to 100 parts by mass of alumina particles (as aggregate particles) having an average particle diameter of 50 μm was added 20 parts by mass of frit (as a sintering aid). Further, water, a dispersing medium and a thickener were added, followed by mixing and kneading, to obtain a puddle. The puddle was subjected to molding, drying and firing to produce a base body. The conditions of firing were 1,250° C. and 1 hour, and the temperature elevation rate and the temperature decrease rate were each 100° C. per hour.

As the frit, there was used one obtained by melting the glass materials shown in Table 1, at 1,600° C. for homogeneity, cooling the homogeneous melt, then grinding it into an average particle diameter of 1 μm.

TABLE 1

| Components | $SiO_2$ | $ZrO_2$ | $Li_2O$ | $Na_2O$ | $K_2O$ | CaO | MgO |
|---|---|---|---|---|---|---|---|
| Mol % | 77 | 10 | 3.5 | 4 | 4 | 0.7 | 0.8 |

[Formation of Filter Membrane]

On the inner surface of the base body was formed a filter membrane of 150 μm in thickness, made of an alumina porous material of 0.5 μm in average pore diameter as measured by the air flow method described in ASTM F 316 (the filter membrane is hereinafter referred to as "membrane A"), whereby was obtained a ceramic filter (hereinafter referred to as "filter A"). The formation of the membrane A was conducted as follows At first, 14 parts by mass of a frit (as a sintering aid) was added to 100 parts by mass of alumina particles (as aggregate particles) having an average particle diameter of 3 μm. Further, water, a dispersing medium and a thickener were added, followed by mixing, to prepare a slurry. Using this slurry, a membrane was formed on the inner surface of the base body by the filter membrane formation method described in JP-B-1988-66566. Then, firing was conducted in an electric furnace in the air, to form a membrane A. The conditions of firing were 950° C. and 1 hour, and the temperature elevation rate and the temperature decrease rate were each 100° C. per hour. As the frit, there was used one obtained by melting the glass materials shown in Table 1, at 1,600° C. for homogeneity, cooling the homogeneous melt, then grinding it into an average particle diameter of 1 μm.

On the inner surface of the filter A (i.e. the surface of the membrane A) was formed a filter membrane of 10 μm in thickness, made of a titania porous material of 0.1 μm in average pore diameter as measured by the air flow method described in ASTM F 316 (the filter membrane is hereinafter referred to as "membrane B"), whereby was obtained a ceramic filter (hereinafter referred to as "filter B"). The formation of the membrane B was conducted in the same manner as for the membrane A except that water, a dispersing medium and a thickener were added to titania particles (as aggregate particles) having an average particle diameter of 0.5 μm, to prepare a slurry.

[Formation of Glass Seal]

The formation of glass seal was conducted as follows. At first, there was prepared a frit by melting the glass raw materials shown in Table 2, at 1,600° C., for homogeneity, cooling the homogeneous melt, and grinding it into an average particle diameter of 15 μm. The frit was mixed with water and an organic binder to prepare a slurry. The slurry was coated on two end faces of ceramic filter, followed by drying and firing, to obtain various ceramic filters each provided with a glass seal. The conditions of firing were the same as in production of the membrane A.

TABLE 2

| Components | $SiO_2$ (mol %) | $ZrO_2$ (mol %) | $Al_2O_3$ (mol %) | $Li_2O$ (mol %) | $Na_2O$ (mol %) | $K_2O$ (mol %) | CaO (mol %) | MgO (mol %) | BaO (mol %) | SrO (mol %) | ZnO (mol %) | $B_2O_3$ (mol %) | Total (mol %) |
|---|---|---|---|---|---|---|---|---|---|---|---|---|---|
| Frit 1 | 60 | 3 | 4 | 0 | 0 | 0 | 16 | 0 | 11 | 0 | 2 | 4 | 100 |
| Frit 2 | 61 | 1 | 5 | 0 | 0 | 0 | 16 | 0 | 12 | 0 | 0 | 5 | 100 |
| Frit 3 | 58 | 8 | 5 | 0 | 0 | 0 | 15 | 0 | 12 | 0 | 0 | 2 | 100 |
| Frit 4 | 78 | 9 | 0 | 3 | 8 | 2 | 0 | 0 | 0 | 0 | 0 | 0 | 100 |
| Frit 5 | 59.5 | 3 | 4 | 0 | 0 | 0 | 15.5 | 0 | 11 | 0 | 3 | 4 | 100 |
| Frit 6 | 62 | 0 | 5 | 0 | 0 | 0 | 16 | 0 | 12 | 0 | 0 | 5 | 100 |
| Frit 7 | 65 | 3 | 5 | 0 | 0 | 0 | 4 | 0 | 19 | 0 | 0 | 4 | 100 |
| Frit 8 | 68 | 3 | 5 | 0 | 0 | 0 | 0 | 0 | 21 | 0 | 0 | 3 | 100 |

TABLE 2-continued

| Components | SiO$_2$ (mol %) | ZrO$_2$ (mol %) | Al$_2$O$_3$ (mol %) | Li$_2$O (mol %) | Na$_2$O (mol %) | K$_2$O (mol %) | CaO (mol %) | MgO (mol %) | BaO (mol %) | SrO (mol %) | ZnO (mol %) | B$_2$O$_3$ (mol %) | Total (mol %) |
|---|---|---|---|---|---|---|---|---|---|---|---|---|---|
| Frit 9 | 55 | 8 | 5 | 0 | 0 | 0 | 15 | 0 | 13 | 0 | 0 | 4 | 100 |
| Frit 10 | 55 | 11 | 5 | 0 | 0 | 0 | 14 | 0 | 12 | 0 | 0 | 3 | 100 |
| Frit 11 | 59.5 | 8.5 | 5 | 0 | 0 | 0 | 11.5 | 0 | 13.5 | 0 | 0 | 2 | 100 |
| Frit 12 | 59 | 8 | 5 | 0 | 0 | 0 | 11.5 | 0 | 12 | 2 | 0 | 2.5 | 100 |
| Frit 13 | 63 | 3 | 5 | 0 | 0 | 0 | 9 | 0 | 17 | 0 | 0 | 3 | 100 |
| Frit 14 | 63 | 10 | 5 | 0 | 0 | 0 | 4 | 0 | 15 | 0 | 0 | 3 | 100 |

Each of the above-obtained ceramic filters provided with a glass seal was evaluated for corrosion resistance by the following method.

There were prepared, as chemical solutions for washing, an aqueous solution containing 2% by mass of citric acid and an aqueous solution of sodium hypochlorite (effective chlorine content: 5,000 ppm). The temperatures of these chemical solutions were set at 30° C. Each ceramic filter was immersed in each chemical solution for 6 hours (total 12 hours and this was taken as one cycle). The cycle was repeated a plurality of times. After each 10 times (each 10 cycles) of immersion operation, the bubbling pressure of glass seal portion was measured according to the test method for bubbling point described in JIS K 3832, and the corrosion resistance of ceramic filter was evaluated from the change of the bubbling pressure. Specifically explaining, when the bubbling pressure at glass seal portion was 100 kPa or more, the ceramic filter was judged to have no deterioration. The measurement was continued up to the immersion times when the bubbling pressure became lower than 100 kPa and the corrosion resistance was evaluated based on the times. The results are shown in Table 3 to Table 5.

TABLE 3

| | Membrane(s) | Frit | Alkali metal oxide (mol %) | Zinc oxide (mol %) | Zirconia (mol %) | Corrosion resistance (times) |
|---|---|---|---|---|---|---|
| Ex. 1 | A | 1 | 0 | 2 | 3 | 60 |
| Ex. 2 | A | 2 | 0 | 0 | 1 | 60 |
| Ex. 3 | A | 3 | 0 | 0 | 8 | 100 |
| Ex. 4 | A + B | 3 | 0 | 0 | 8 | 100 |
| Comp. Ex. 1 | A | 4 | 13 | 0 | 9 | 10 |
| Comp. Ex. 2 | A | 5 | 0 | 3 | 3 | 20 |
| Comp. Ex. 3 | A | 6 | 0 | 0 | 0 | 20 |

* Corrosion resistance (times) indicates the immersion times when the bubbling pressure of seal portion became lower than 100 kPa.

TABLE 5

| | Membrane | Frit | Calcia (mol %) | Corrosion resistance (times) |
|---|---|---|---|---|
| Ex. 6 | A | 9 | 54 | 100 |
| Ex. 7 | A | 11 | 46 | No bubbling |
| Ex. 8 | A | 12 | 45 | No bubbling |
| Ex. 9 | A | 13 | 35 | No bubbling |
| Ex. 10 | A | 14 | 21 | No bubbling |

* Corrosion resistance (times) indicates the immersion times when the bubbling pressure of seal portion became lower than 100 kPa.
* Calcia (mol %) indicates the mol % of calcia relative to the total mols of calcia, baria and strontia.

As indicated in Table 3, in each of the ceramic filters of Examples 1 to 4, whose glass seals were each constituted by an alkali-free glass of the present invention, the bubbling pressure of glass seal portion was 100 kPa or more even after 50 times of immersion operation and the corrosion resistance was good. Meanwhile, in each of the ceramic filter of Comparative Example 1 whose glass seal used no alkali-free glass, the ceramic filter of Comparative Example 2 whose glass seal contained more than 2 mol % of zinc oxide and the ceramic filter of Comparative Example 3 whose glass seal contained no zirconia, the bubbling pressure of glass seal portion was as low as less. than 100 kPa when the immersion operation was repeated 20 times, and the corrosion resistance was insufficient.

Table 4 shows data obtained when glass seals were formed using frits different in zirconia content, silica content and alkaline earth metal oxide content and the effects of such glass seals were examined. A comparison of the data of Examples 3, 5 and 6 indicates a higher corrosion resistance when the zirconia content was higher. However, when the zirconia content exceeded 10 mol % as in Comparative Example 5, formation of homogeneous glass frit was impossible; and in Comparative Example 4 wherein the silica content exceeded 65 mol %, cracks generated in the seal after its firing.

TABLE 4

| | Membrane | Frit | Zirconia (mol %) | Silica (mol %) | Alkaline earth metal oxide (mol %) | Corrosion resistance (times) | Remarks |
|---|---|---|---|---|---|---|---|
| Ex. 5 | A | 7 | 3 | 65 | 23 | 80 | |
| Ex. 3 | A | 3 | 8 | 58 | 27 | 100 | |
| Ex. 6 | A | 9 | 8 | 55 | 28 | 100 | |
| Comp. Ex. 4 | A | 8 | 3 | 68 | 21 | 0 | Generation of cracks in seal portion |
| Comp. Ex. 5 | A | 10 | 11 | 55 | 26 | — | No formation of homogeneous glass |

* Corrosion resistance (times) indicates the immersion times when the bubbling pressure of seal portion became lower than 100 kPa.
* Alkaline earth metal oxide (mol %) indicates the total content of calcia, baria and strontia.

Table 5 shows data obtained when there was examined, for alkali-free glasses each constituting a glass seal, the effect of calcia content in alkaline earth metal oxide, on corrosion resistance. As shown in Table 5, in Examples 7 to 9 containing calcia in an amount of 20 to 50 mol % relative to the total mols of alkaline earth metal oxide (calcia, baria and strontia), there was no drop in the bubbling pressure of seal portion even after 100 times of immersion operation and, as compared with Example 6, the corrosion resistance was extremely good.

The ceramic filter of the present invention can be used for filtration and removal of the suspended matter, microbes, dust, etc. contained in a fluid such as liquid, gas or the like, in a variety of fields such as water treatment, exhaust gas treatment, medicine, food and the like. The present ceramic filter can be preferably used particularly in water treatment fields such as production of drinking water and industrial water, purification of waste water and industrial waste water, and the like, for removal of harmful substances in liquid, such as suspended matter, pathogenic microbes and the like.

What is claimed is:

1. A ceramic filter comprising:
   a base body having a plurality of partition walls formed therein, the partition walls comprising a ceramic porous body having a large number of pores, wherein the partition walls define a plurality of individual fluid passage cells within the base body;
   filter membranes provided on the partition walls and comprising a ceramic porous body having a large number of pores having an average pore diameter that is smaller than an average pore diameter of the pores in the surface of each partition wall, wherein at least part of each ceramic porous body has a structure wherein aggregated particles are bonded to each other with a glass component; and
   a glass seal provided so as to cover at least an end face of the base body, the glass seal comprising an alkali-free glass having a composition including silica ($SiO_2$) in an amount of 55 to 65 mol %, zirconia ($ZrO_2$) in an amount of 1 to 10 mol % and at least one alkaline earth metal oxide selected from the group consisting of calcia (CaO), baria (BaO) and strontia (SrO), but being substantially free of zinc oxide (ZnO), whereby the composition of the alkali-free glass inhibits components of the alkali-free glass from migrating into the ceramic porous bodies, thereby preventing corrosion of the base body and the filter membranes in the vicinity of the glass seal to improve the corrosion resistance of the ceramic filter.

2. The ceramic filter according to claim 1, wherein the alkaline earth metal oxide of the alkali-free glass is present in an amount of 20 to 30 mol %.

3. The ceramic filter according to claim 1, wherein the alkaline earth metal oxide contains calcia in an amount of 20 to 50 mol % with respect to the total molar amount of the alkaline earth metal oxide.

* * * * *